US010492013B2

United States Patent
Qiu et al.

(10) Patent No.: US 10,492,013 B2
(45) Date of Patent: Nov. 26, 2019

(54) TESTING OF VEHICLE SYSTEM MODULE USING AUDIO RECOGNITION

(71) Applicant: GM GLOBAL TECHNOLOGY OPERATIONS LLC, Detroit, MI (US)

(72) Inventors: Robert G. Qiu, Thornhill (CA); Meijun Wang, Maple (CA); Gagandeep S. Chabbewal, Brampton (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 182 days.

(21) Appl. No.: 15/705,007

(22) Filed: Sep. 14, 2017

(65) Prior Publication Data
US 2019/0082279 A1 Mar. 14, 2019

(51) Int. Cl.
*H04R 29/00* (2006.01)
*G07C 5/08* (2006.01)
*G10L 15/22* (2006.01)
*G10L 25/51* (2013.01)
*G10L 15/01* (2013.01)

(52) U.S. Cl.
CPC ......... *H04R 29/001* (2013.01); *G07C 5/0808* (2013.01); *G10L 15/22* (2013.01); *G10L 25/51* (2013.01); *G10L 15/01* (2013.01); *G10L 2015/223* (2013.01); *H04R 2499/13* (2013.01)

(58) Field of Classification Search
CPC ..... H04R 29/001; G07C 5/0808; G10L 15/22; G10L 25/51
USPC .......................................................... 701/32
See application file for complete search history.

(56) References Cited

U.S. PATENT DOCUMENTS

| | | | | |
|---|---|---|---|---|
| 9,376,117 | B1* | 6/2016 | Parundekar | B60W 50/087 |
| 9,626,966 | B2* | 4/2017 | Berndt | G10L 15/22 |
| 10,068,573 | B1* | 9/2018 | Aykac | G06F 3/167 |
| 2009/0164216 | A1* | 6/2009 | Chengalvarayan | B60R 16/0373 704/251 |
| 2014/0309870 | A1* | 10/2014 | Ricci | H04W 4/21 701/36 |
| 2016/0073211 | A1* | 3/2016 | Zaman | H04R 29/00 381/58 |
| 2016/0111088 | A1* | 4/2016 | Park | G01C 21/3608 704/275 |
| 2016/0307568 | A1* | 10/2016 | Zhao | G10L 15/22 |
| 2016/0371977 | A1* | 12/2016 | Wingate | B60W 50/16 |
| 2018/0332389 | A1* | 11/2018 | Ekkizogloy | H04R 1/406 |

\* cited by examiner

*Primary Examiner* — Yazan A Soofi
(74) *Attorney, Agent, or Firm* — Reising Ethington P.C.; James E. Howard (57) ABSTRACT

A system and method of testing one or more operations of a vehicle system module (VSM) using computer-based audio recognition techniques, wherein the method is carried out by a computer that includes or is connected to a microphone, wherein the VSM includes or is connected to an audio speaker, and wherein the method includes the steps of: carrying out one or more initial VSM test actions; listening for one or more audio signals from the VSM audio speaker using the computer microphone; processing the one or more audio signals using computer-based audio-recognition technique(s); and determining whether the one or more performed VSM operations correspond to one or more VSM test actions.

16 Claims, 2 Drawing Sheets

TESTING OF VEHICLE SYSTEM MODULE USING AUDIO RECOGNITION

INTRODUCTION

The present invention relates to testing vehicle system modules using audio recognition techniques.

Vehicles include hardware and software capable of various multimedia functions, including playing audio received from radio stations, mobile devices (e.g., smartphones, tablets), as well as performing various other functionality such as receiving a phone call and acting as an interface to carry out the call. However, testing multimedia playback and other vehicle functionality can be time consuming and costly due to, for example, having a person carry out the test procedures.

SUMMARY

According to one aspect of the invention, there is provided a method of testing one or more operations of a vehicle system module (VSM) using computer-based audio recognition techniques, wherein the method is carried out by a computer that includes or is connected to a microphone, wherein the VSM includes or is connected to an audio speaker, and wherein the method includes the steps of: carrying out one or more initial VSM test actions, wherein the one or more initial VSM test actions include one or more of the following: (a) tuning a radio receiver installed in the VSM or coupled to the VSM to a particular radio station; (b) playing a verbal command from an audio speaker included in or connected to the computer, wherein the verbal command is an audio signal portraying one or more spoken words that are intended to cause the VSM to perform an operation; (c) calling a cellular device included in or connected to the VSM through use of a cellular carrier system; (d) establishing a short-range wireless communications (SRWC) connection between the VSM and a SRWC device using a SRWC circuit coupled to VSM and a SRWC circuit installed in the SRWC device; (e) sending a command message to the VSM, wherein the command message includes a command intended to cause the VSM to perform an operation; and (f) recalling a test operation from a computer-readable test file that is stored on memory on the computer or on another computer that is communicatively coupled to the computer; listening for one or more audio signals from the VSM audio speaker using the computer microphone; processing the one or more audio signals using computer-based audio-recognition technique(s); and determining whether the one or more performed VSM operations correspond to one or more VSM test actions.

According to various embodiments, this method may further include any one of the following features or any technically-feasible combination of these features:

wherein the one or more initial VSM test actions includes tuning the radio receiver installed in the VSM or coupled to the VSM to the particular radio station;

the step of transmitting one or more radio signals using a radio transmitter that is included in or connected to the computer, wherein the one or more radio signals are amplitude modulated (AM) or frequency modulated (FM) signals that are used to convey audio, wherein the VSM is configured to receive the one or more radio signals using the radio receiver;

wherein the one or more initial VSM test actions includes sending audio signals to be played by the VSM to the VSM and/or commanding the VSM to play audio from a particular multimedia source, wherein the particular multimedia source includes any one or more of the following: an amplitude modulated (AM) or frequency modulated (FM) radio station, an audio stream from a short-range wireless communication (SRWC) enabled mobile device, or audio from a cellular telephone call;

the step of generating an audio fingerprint based on the one or more audio signals from the VSM audio speaker and, wherein the audio fingerprint is used to determine whether the one or more performed VSM operations correspond to the one or more VSM test actions;

the step of comparing the generated audio fingerprint to another audio fingerprint and, based on the comparison, then determining whether the one or more performed VSM operations correspond to the one or more VSM test actions;

wherein the audio fingerprint is obtained through use of a music recognition algorithm, and further comprising the step of obtaining a title of the one or more audio signals based on the audio fingerprint;

the step of sending a command signal to the VSM that directs the VSM to carry out a particular multimedia function, wherein the particular multimedia function includes one of the following: playing audio from a particular multimedia source, continuing playing audio, pausing playback of audio, fast-forwarding playback of audio, and/or rewinding playback of audio;

the step of sending another command signal to the VSM that directs the VSM to carry out another particular multimedia function, wherein the another particular multimedia function includes one of the following: playing audio from a particular multimedia source, continuing playing audio, pausing playback of audio, fast-forwarding playback of audio, and/or rewinding playback of audio;

wherein the one or more initial VSM test actions includes playing the verbal command from the audio speaker included in or connected to the computer;

wherein the processing step further includes accessing an audio grammar of the VSM and, using the audio grammar, processing the one or more audio signals to determine one or more words being conveyed by the VSM through the one or more audio signals;

wherein the one or more words are used to determine whether the one or more performed VSM operations correspond to the one or more VSM test actions; and/or the step of identifying, based on the processing step, the one or more performed VSM operations.

According to another aspect of the invention, there is provided a method of playing a verbal command from the audio speaker of the computer, wherein the verbal command is an audio signal portraying one or more spoken words that are intended to cause the VSM to perform an intended operation, and wherein the VSM is configured to: receive the verbal command using the VSM microphone; access an audio grammar of the VSM, wherein the audio grammar of the VSM is stored in a non-transitory, computer-readable memory of the VSM or accessible by the VSM; process the one or more audio signals using the audio grammar of the VSM to obtain one or more words being conveyed by the audio signal; and perform an operation corresponding to the one or more words being conveyed by the audio signal; after playing the verbal command from the audio of the computer, receiving a VSM operation response; identifying one or more performed VSM operations based on the VSM operation response; and determining whether the one or more performed VSM operations correspond to the intended operation based on comparing the one or more audio signals.

According to yet another aspect of the invention, there is provided a method of testing one or more operations of a vehicle system module (VSM) using computer-based audio recognition techniques, wherein the method is carried out by a computer that includes or is connected to a microphone, wherein the VSM includes or is connected to an audio speaker, and wherein the method includes the steps of: carrying out one or more initial VSM test actions, wherein the one or more initial VSM test actions include one or more of the following: (a) tuning a radio receiver installed in the VSM or coupled to the VSM to a particular radio station; (b) calling a cellular device included in or connected to the VSM through use of a cellular carrier system; and (c) establishing a short-range wireless communications (SRWC) connection between the VSM and a SRWC device using a SRWC circuit; after carrying out the one or more initial VSM test actions, listening for one or more audio signals from the VSM audio speaker using the computer microphone; generating an audio fingerprint based on the one or more audio signals from the VSM audio speaker using computer-based audio-recognition technique(s), wherein the audio fingerprint is a set of data representing the one or more audio signals that is obtained through use of a time-frequency analysis of the one or more audio signals; and determining whether the one or more performed VSM operations correspond to the one or more VSM test actions based on comparing the audio fingerprint to one or more expected audio fingerprints, wherein the one or more expected audio fingerprints are audio fingerprints that were generated based on one or more test audio files.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

The system and method described below enables various vehicle system module (VSM) functions to be automatically tested through use of computer-based audio recognition techniques. During development of a VSM, such as an infotainment unit, testing is desired to ensure that the VSM operates as intended. In some cases, audio playback of the VSM needs to be assessed to ensure that the correct audio is being played or that the correct VSM function is being performed. The system and methods discussed herein provide various embodiments that can be used to test one or more operations of a VSM using one or more computer-based audio recognition techniques.

In many embodiments, testing of the VSM can include the following steps: carrying out one or more VSM test actions; listening for one or more audio signals from the VSM audio speaker using the computer microphone; processing the one or more audio signals using computer-based audio-recognition technique(s); identifying, based on the processing step, one or more performed VSM operations; and determining whether the one or more performed VSM operations correspond to the one or more VSM test actions. In one particular embodiment, a computer (e.g., a personal computer (PC)) can use a radio transmitter to transmit test audio via radio signals over a particular amplitude modulated (AM) or frequency modulated (FM) frequency, and the computer can then command (e.g., via a verbal command) the VSM to that particular radio frequency with the intention that the VSM play the correct audio through an audio speaker. The computer can then receive audio signals from the audio speaker and, through use of audio recognition techniques, the computer can verify that the VSM tuned to the correct radio frequency and played the correct test audio. Numerous other embodiments exist that can be used to test a variety of different VSM functionality, as is evident from the discussion below. Thus, in many embodiments, the method, which may be carried out (at least in part) through the use of a VSM test application on a computer, can be used to improve and/or address problems inherent in the computer-related technology of automated electronic module testing.

Figure 1:
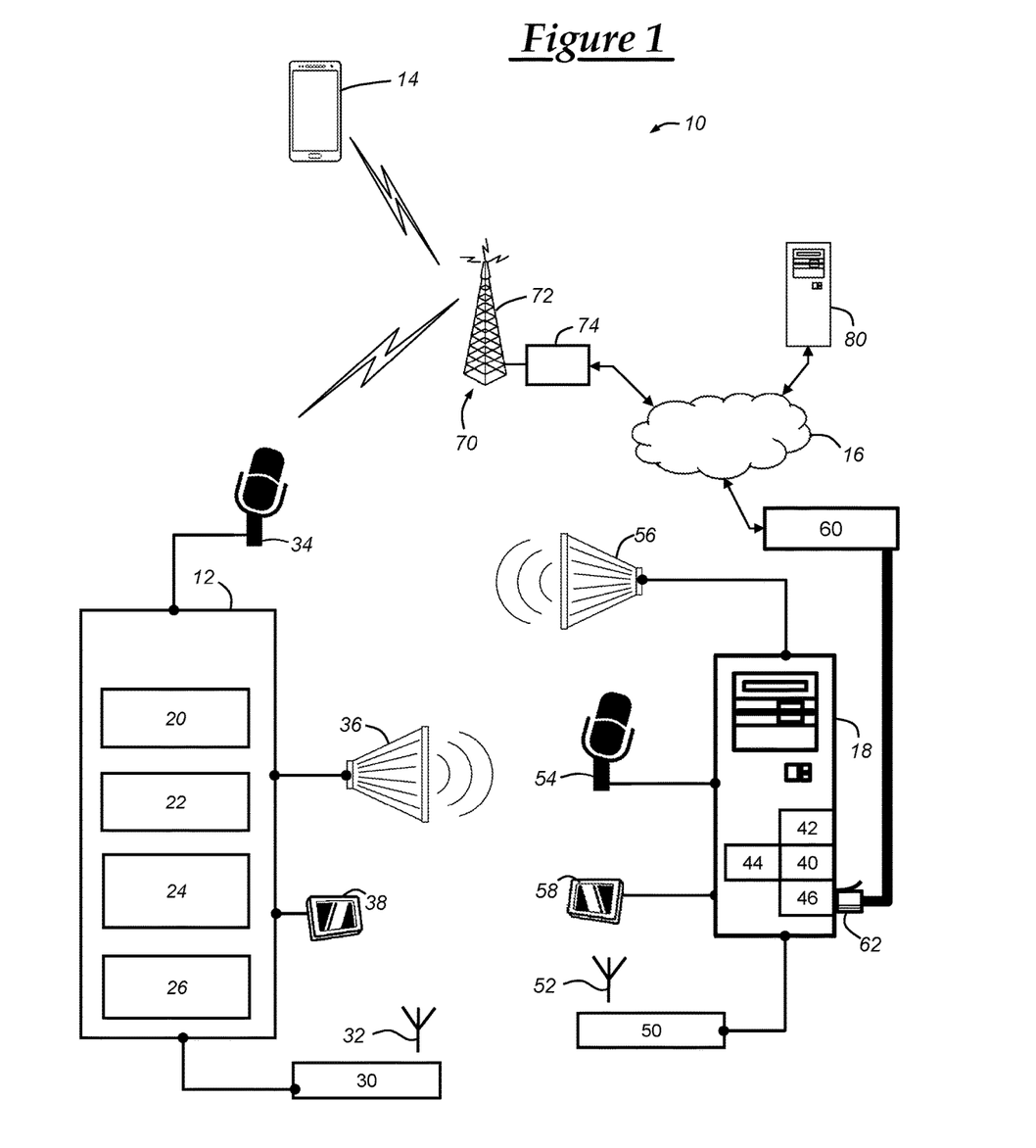
FIG. 1 is a block diagram depicting an embodiment of a communications system that is capable of utilizing the method disclosed herein.

With reference to FIG. 1, there is shown an operating environment that comprises a communications system 10 and that can be used to implement the method disclosed herein. Communications system 10 generally includes a vehicle system module (VSM) in the form of an infotainment unit 12, one or more wireless carrier systems 70, a land communications network 16, a computer 18, a mobile device 14, and a remote computer 80. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

The vehicle system module (VSM) being tested is depicted in the illustrated embodiment as an infotainment unit, however, the VSM being tested can be any vehicle system module that can be incorporated into a vehicle that includes electronics configured to carry out one or more functions. The VSM can be installed into a passenger car, motorcycle, truck, sports utility vehicle (SUV), recreational vehicle (RV), marine vessel, aircraft including unmanned aerial vehicles (UAVs). Some of the VSM components are shown generally in FIG. 1 and include a cellular chipset 20, a short-range wireless communication (SRWC) circuit 22, a processor 24, memory 26, a radio receiver 30 with a radio antenna 32, a microphone 34, an audio speaker 36, and a display 38. Some of these devices can be connected directly to the infotainment unit 12, whereas others are indirectly connected using one or more network connections, such as a communications bus or an entertainment bus (not shown). Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

In some embodiments, the VSM under test may be used to carry out at least a part of the method discussed below, which may be done so during development and testing of the VSM before the VSM is installed into a vehicle. Thus, in such embodiments, power may be supplied to the VSM using a battery and/or via a typical 120 volt (V) electrical outlet (or other electrical wall outlet, depending on the power requirements of the VSM). However, in other embodiments, the VSM may already be installed into a vehicle and, thus, the method below may be carried out to test the VSM in the installed vehicle.

As noted above, the VSM under test may be an infotainment unit 12, as depicted in FIG. 1. The infotainment unit 12 can be an electronic vehicle module that includes the cellular chipset 20, short-range wireless communication (SRWC) circuit 22, processor 24, memory 26, radio receiver 30 with the radio antenna 32, microphone 34, audio speaker 36, and display 38. Using this circuitry and suitable programming, the infotainment unit 12 may provide various functionality to the vehicle, such as cellular telephone services, multimedia services, vehicle diagnostic services, as well as enabling control of certain vehicle operations.

The cellular chipset 20 may enable wireless voice and/or data communication over wireless carrier system 70 and via wireless networking. Thus, this chipset can enable the infotainment unit 12 to communicate with a call center or remote facility (e.g., such as a facility that may house computers 18 or 80), mobile device 14, telematics-enabled vehicles, or some other entity or device. The cellular chipset can use radio transmissions to establish a communications channel (a voice channel and/or a data channel) with wireless carrier system 70 so that voice and/or data transmissions can be sent and received over the channel. By providing both voice and data communication, the cellular chipset enables the infotainment unit 12 to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

According to one embodiment, cellular chipset 20 is a standard cellular chipset that enables infotainment unit 12 to carry out cellular communications according to GSM, CDMA, and/or LTE standards for voice communications like hands-free calling. Additionally, cellular chipset 20 can be connected to an antenna (not shown) that can be used to facility transmission and reception of cellular communications. Additionally, the cellular chipset may be connected to SRWC circuit 22, processor 24, and memory 26, as well as a modem (not shown) as to enable the modulation and demodulation of cellular messages to be sent and/or received. It should be appreciated that the modem can either be implemented through software that is stored in the infotainment unit and that is executed by processor 24, or it can be a separate hardware component located internal or external to infotainment unit 12. The modem can operate using any number of different standards or protocols such as LTE, EVDO, CDMA, GPRS, and EDGE.

Additionally, infotainment unit 12 can be configured to communicate wirelessly through use of short range wireless communication (SRWC) circuit 22 according to one or more SRWC protocols, including any of the IEEE 802.11 protocols, WiMAX, ZigBee™, Wi-Fi™ direct, Bluetooth™ (including Bluetooth™ Low Energy (BLE)), or near field communication (NFC). When used for packet-switched data communication such as TCP/IP, the infotainment unit can be configured with a static IP address or can be set up to automatically receive an assigned IP address from another device on the network such as a router or from a network address server.

Processor 24 can be any type of device capable of processing electronic instructions including microprocessors, microcontrollers, host processors, controllers, vehicle communication processors, and application specific integrated circuits (ASICs). It can be a dedicated processor used only for infotainment unit 12 or can be shared with other vehicle systems. Processor 24 executes various types of digitally-stored instructions, such as software or firmware programs stored in memory 26, which enable the infotainment unit to provide a wide variety of services. For instance, processor 24 can execute programs or process data to carry out at least a part of the method discussed herein.

Infotainment unit 12, when installed into a vehicle, can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of infotainment unit 12, but are simply an enumeration of some of the services that the infotainment unit is capable of offering. Furthermore, it should be understood that at least some of the aforementioned modules could be implemented in the form of software instructions saved internal or external to infotainment unit 12, they could be hardware components located internal or external to infotainment unit 12, or they could be integrated and/or shared with each other or with other systems located throughout the vehicle, to cite but a few possibilities. In the event that the modules are implemented as other vehicle system modules (VSMs) located external to infotainment unit 12, they could utilize a vehicle communications bus to exchange data and commands with the telematics unit.

Infotainment unit 12 can be connected to or include the radio receiver 30 and radio antenna 32 that is capable of receiving radio signals. In one embodiment, radio receiver 30 is configured to receive frequency modulated (FM) radio signals at least in the range of 88 to 109 megahertz (MHz) and/or configured to receive amplitude modulated (AM) radio signals at least in the range of 535 to 1605 kilohertz (kHz). Radio signals can be picked up by radio antenna 32 and radio receiver 30 may then convert these signals into electronic signals that may then be used by infotainment unit 12 to obtain information or data, such as multimedia including audio and/or video. In some embodiments, the radio receiver 30 can be a radio transceiver that is capable of both receiving and transmitting radio signals via radio techniques known in the art, including amplitude and frequency modulation techniques.

Infotainment unit 12 can be connected to numerous electronic modules or components that can provide machine user interfaces. Such machine user interfaces can provide users with a means of providing and/or receiving information, and can include microphone 34, speaker 36, and visual display 38. As used herein, the term 'machine user interface' broadly includes any suitable form of electronic device, including both hardware and software components, which enables a user to communicate with or through a component of system 10. Microphone 34 provides audio input to the infotainment unit to enable the user to provide voice commands and carry out hands-free calling via the wireless carrier system 70. For this purpose, it can be connected to an on-board automated voice processing unit utilizing human-machine interface (HMI) technology known in the art. Speaker 36 provides audio output to a user and can be a dedicated, stand-alone system or integrated into the infotainment unit 12, such as audio from AM, FM and satellite radio, CD, DVD, and/or other multimedia services. Visual display 38 is preferably a graphics display, such as a touch screen, and can be used to provide a multitude of input and output functions. Display 38 can be a standalone device, or may be integrated into the housing of infotainment unit 12. Various other human user interfaces can also be utilized, as the interfaces of FIG. 1 are only an example of one particular implementation.

Wireless carrier system 70 is preferably a cellular telephone system that includes a plurality of cell towers 72 (only one shown), one or more mobile switching centers (MSCs) 74, as well as any other networking components required to connect wireless carrier system 70 with land network 16. Each cell tower 72 includes sending and receiving antennas and a base station, with the base stations from different cell towers being connected to the MSC 74 either directly or via intermediary equipment such as a base station controller. Cellular system 70 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 70. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the transmitting station, packaged for upload, and then sent to the satellite, which broadcasts the programming to subscribers. Bi-directional communication can be, for example, satellite telephony services using the satellite to relay telephone communications between the infotainment unit 12 and the base station. If used, this satellite telephony can be utilized either in addition to or in lieu of wireless carrier system 70.

Land network 16 may be a conventional land-based telecommunications network that is connected to one or more landline telephones and connects wireless carrier system 70 to computers 18 and 80. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, computer 18 need not be connected via land network 16, but could include wireless telephony equipment so that it can communicate directly with a wireless network, such as wireless carrier system 70.

Test computer 18 may be implemented as any one of a number of computers, such as a personal computer, laptop, tablet, notebook, etc. Test computer is a computer that carries out one or more test procedures for testing of a VSM, such as infotainment unit 12. Computer 18 can include various components, including a networking interface (e.g., a network interface card 46, SRWC circuit 44) that enables computer 18 to communicate according to one or more known protocols, such as SRWC and/or cabled or wired connections (e.g., IEEE 802.3 (Ethernet)). Additionally, at least in some embodiments, computer 18 can be connected to a modem via an Ethernet cable 62 or via SRWC, such as Wi-Fi™. And, in turn, the modem can be connected to land network 16 thereby providing computer 18 with access to one or more other remote devices, such as mobile device 14, via a private or public network such as the Internet.

As depicted in the illustrated embodiment, computer 18 can include a processor 40, memory 42, a short-range wireless communication (SRWC) circuit 44, and a network interface card (NIC) 46. Processor 40 can be a typical computer processing unit (CPU) for a personal computer, such as those offered by Intel™ and AMD™. Other processing units capable of executing computer instructions can be used as well, including various microprocessors. Additionally, processor 40 can be similar to processor 24 of infotainment unit 12 and can include or consist of any of the types of processors or processing units discussed above with respect to processor 42. In some embodiments, processor 40 can reside on a motherboard (not shown) and can be connected to random access memory and/or non-volatile, non-transitory computer readable memory, such as memory 42. The processor 40 can be connected to various components of computer 18, including memory 42, SRWC circuit 44, and/or NIC 46, any of which may also reside or be connected to the motherboard. Memory 42 can be any type of memory, including any of those discussed above with respect to memory 26 of infotainment unit 12, which may be RAM or non-volatile, non-transitory computer readable memory. And, SRWC circuit 44 can include circuitry that enables SRWC protocols to be used by computer 18 in communicating with another device, such as infotainment unit 12 and/or mobile device 14.

Computer 18 can also include a radio transmitter 50 that is connected to a radio antenna 52. The radio transmitter can be configured to transmit frequency modulated (FM) radio signals at least in the range of 88 to 109 megahertz (MHz) and/or configured to transmit amplitude modulated (AM) radio signals at least in the range of 535 to 1605 kilohertz (kHz). Radio transmitter 50 may convert electronic signals into radio signals (e.g., AM or FM radio signals) that may include data, such as multimedia including audio and/or video. Subsequently, the radio signals can be transmitted up by radio antenna 52, which may be picked up or received by radio antenna 32 of infotainment unit 12. In some embodiments, the radio transmitter 50 can be a radio transceiver that is capable of both receiving and transmitting radio signals via radio techniques known in the art, including amplitude and frequency modulation techniques.

Computer 18 can be connected to numerous electronic modules or components that can provide machine user interfaces, such as microphone 54, speaker 56, and visual display 58. Microphone 54 provides audio input to the computer to enable the computer to receive audio, such as from speaker 36 of infotainment unit 12. For this purpose, it can be connected to an on-board automated voice processing unit utilizing human-machine interface (HMI) technology known in the art, as will be described in more detail below. Speaker 56 provides audio output to a user and can be a dedicated, stand-alone system or integrated into the computer 18, such as audio from AM, FM and satellite radio, CD, DVD, and/or other multimedia services. Visual display 58 is preferably a graphics display, such as a computer monitor, and can be used to provide a multitude of input and output functions. Display 58 can be a standalone device, or may be integrated into the housing of computer 18. Various other human user interfaces can also be utilized, as the interfaces of FIG. 1 are only an example of one particular implementation.

Computer 18 can also be connected to a land network via a network access device (NAD) such as modem 60. Modem 60 is a network computing device and includes hardware that communicates with one or more remote networks and, as used herein, and as those skilled in the art will appreciate, a "modem" refers to a network hardware device that modulates one or more signals to encode data for transmission and that demodulates signals to decode received data. Modem (or NAD) 16 may also include or be communicatively coupled to a router that can provide a local area network (LAN) including wireless LAN (WLAN). Also, as used herein, and as those skilled in the art will appreciate, a "router" refers to a networking device that facilitates communications between computer networks, such as between an intranet (e.g., local area network (LAN), wireless local area network (WLAN), wide area networks (WAN)) and a remote network, such as the Internet. The router, which may be included as part of the network access device, may keep addressing information for devices that are a part of a local intranet, such as network computing device 18, infotainment unit 12 or other VSM, and/or mobile device 14. The addressing information may be kept in a routing table or a routing information base (RIB), which is a data structure that stores information that can be used to route IP packets that are being communicated between networks. The routing table can be stored in a memory device at network access device 60, and such functionality of the network access device can be carried out by a processor or other processing device installed in network access device 60. In one embodiment, network access device 60 includes a modem and a router, and is configured to transfer data between network computing devices and a land network 16.

Additionally, computer 18 may include one or more network interface controllers (NIC) 46, which can include any of a variety of network drivers, network adapters, network cards, or network interfaces. The network interface controller can be a hardware component that connects a circuit board (e.g., motherboard) or communications bus to a computer network, such as a LAN or a WLAN. In one example, NIC 46 can be an Ethernet card that enables communications between the modem 16 and computer 18 via Ethernet cable 62. Additionally, or alternatively, computer 18 can include a wireless network interface controller (WNIC) (e.g., SRWC circuit) 44, which can include an antenna and which may operate according to one or more the SRWC communications as described above, including IEEE 802.11b/g/n/ac/ad. In many embodiments computer 18 includes numerous network interfaces, including numerous wired ports, including Ethernet ports, universal serial bus (USB) ports, fiber-optic ports, token ring, as well as numerous other ports known to those skilled in the art. Additionally, or alternatively, computer 18 may be able to communicate accord to a variety of SRWC and may include variety of WNICs.

Computer 18 can also include a VSM test application that is stored on memory 42 and that may be executed by processor 40. The VSM test application can be a set of computer instructions that is configured to carry out at least some of the method discussed below. The VSM test application can test various VSM functions automatically through use of computer-based audio recognition techniques. During development of the VSM, such as the infotainment unit 12, testing is desired to ensure that the VSM operates as intended. In some embodiments, the VSM test application can be executed by the computer, which causes the computer to carry out testing of the VSM. The testing can include verifying audio playback of the VSM is correct through using audio recognition techniques in conjunction with microphone 54.

For example, computer 18 can be configured to recall various audio files from memory 42 and to then use radio transmitter 50 to transmit various audio signals using FM and/or AM radio signals that represent the audio contained in the audio files. For example, the radio transmitter 50 may transmit signals on FM station (frequency) 89.7 MHz. Then, the infotainment unit 12 can be tuned to a particular radio station, such as that FM frequency 89.7 MHz, and to play the received radio signals through speaker 36. Then, computer 18 can use microphone 54 to receive the audio of speaker 36 of infotainment unit 12. Through use of computer-based audio recognition techniques, the computer 18 can process the received audio signals and then compare the processed signals with the audio files and/or another file or other data that corresponds to the audio files to determine whether the infotainment unit correctly carried out the particular multimedia playback function, which in this case was playing the correct FM radio station. Various other test scenarios may be carried out by the system 10, some of which are discussed below.

Computers 80 (only one shown) can include similar hardware and/or software components as computer 18, but, at least in some embodiments, computer 80 may be used to carry out different functionality, such as a web server accessible by infotainment unit 12 via wireless carrier 14 and land network 16. Other such accessible computers 18 can be, for example: a service center computer where diagnostic information and other vehicle/infotainment-related data can be uploaded from the infotainment unit 12; a client computer used by a subscriber for such purposes as accessing or receiving data related to the vehicle of infotainment unit 12; or a third party repository to or from which data or other information is provided, whether by communicating with the infotainment unit 12 or computer 18, or both. A computer 80 can also be used for providing Internet connectivity such as DNS services or as a network address server that uses DHCP or other suitable protocol to assign an IP address to the infotainment unit 12 and/or computer 18.

Mobile wireless device 14 can include: hardware, software, and/or firmware enabling cellular telecommunications and/or short range wireless communication (SRWC), as well as other wireless device functions and applications. The hardware of mobile device 14 comprises a processor and memory for storing the software, firmware, etc. This memory may include volatile RAM or other volatile memory, as well as a non-transitory computer readable medium that stores some or all of the software needed to carry out the various external device functions discussed herein. The mobile device processor and software stored in the memory enable various software applications, which may be preinstalled or installed by the user (or manufacturer) (e.g., having a software application or graphical user interface (GUI)). This may include an application that allows a vehicle user to communicate with infotainment unit 12 and/or to control various aspects or functions of the infotainment unit—e.g., among other things, controlling multimedia playback including selecting multimedia input sources, controlling volume audio output levels, etc. The application may also be used to enable the user of device 14 to view information pertaining to the infotainment unit and/or pertaining to an account associated with the user. Wireless device 14 is shown as a smartphone having cellular telephone capabilities. In other embodiments, device 14 may be a tablet, laptop computer, or any other suitable device. In addition, the application may also allow the user to connect with the computer 18.

Figure 2:
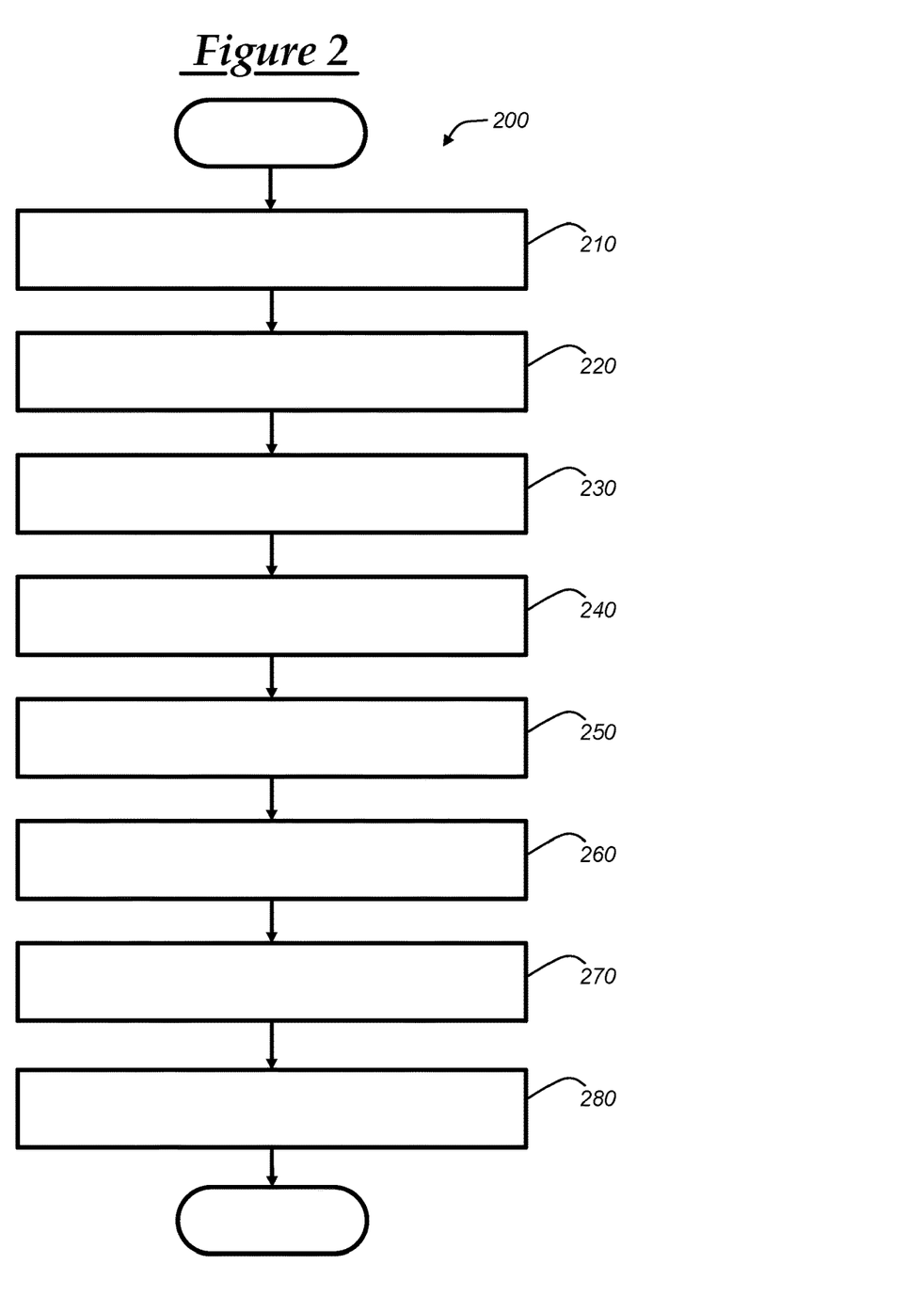
FIG. 2 is a flowchart of an embodiment of a method of testing one or more operations of a vehicle system module (VSM) using computer-based audio recognition techniques.

Turning now to FIG. 2, there is shown an embodiment of a method 200 of testing one or more operations of a vehicle system module (VSM) using computer-based audio recognition techniques. The method 200 can enable the testing of various multimedia functions of a VSM through use of computer-based audio recognition techniques that are carried out using a VSM test application. The VSM test application can use the computer-based audio recognition techniques to verify the results of various test procedures by receiving audio via a computer microphone. Thus, at least in some embodiments, the method 200 can be used to automate VSM testing of various multimedia functions even in the absence of a test engineer thereby enabling 24 hour, 7 day a week testing of the VSM.

In many embodiments, method 200 can include the following steps: carrying out one or more VSM test actions; listening for one or more audio signals from the VSM audio speaker using the computer microphone; processing the one or more audio signals using computer-based audio-recognition technique(s); identifying, based on the processing step, one or more performed VSM operations; and determining whether the one or more performed VSM operations correspond to the one or more VSM test actions. In one particular embodiment, a computer (e.g., a personal computer (PC)) 18, can use radio transmitter 50 to transmit radio signals, and the computer can then tune the VSM to a particular radio station with the intention that the VSM play the correct audio through an audio speaker. The computer can then receive audio signals from the audio speaker via microphone 54 and, through use of audio recognition techniques, the computer can verify that the VSM played the correct audio file.

The method or parts thereof can be implemented in a computer program product embodied in a computer readable medium and including instructions usable by one or more processors of one or more computers of one or more systems to cause the system(s) to implement one or more of the method steps. The computer program product may include one or more software programs or applications, such as VSM test application, comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

The method 200 begins with step 210, wherein the vehicle system module (VSM) test application is initiated. The VSM test application, which can be stored on memory 42 of computer 18, may be initiated by a test engineer that uses an input device (e.g., a computer mouse or keyboard) to cause the computer to begin executing the VSM test application. In some embodiments, the VSM test application can be stored on a memory device of another computer or device that is connected to computer 18. Computer 18 can then use processor 40 to carry out the VSM test application, which can contain numerous computer instructions. The VSM test application can be, for example, compiled computer software instructions that is executable by the processor 40. The method 200 continues to step 220.

In step 220, the VSM is initiated. Initiating the VSM can include powering on the VSM and/or setting the VSM to a particular test or debugging mode. The VSM can be initiated by a user manually through plugging the VSM into a power outlet and/or actuating a power switch on the VSM. Or, the VSM may be initiated automatically by another electronic computing device, such as computer 18 and/or mobile device 14. In one embodiment, infotainment unit 12 (or other VSM) is connected via a wired connection to computer 18. In such a case, the computer 18 may send a "power on" signal to the VSM thereby causing the VSM to turn on.

Steps 210 and 220 may be carried out in any order, including at the same time. For example, in one embodiment, the VSM test application may be initiated on computer 18 and, as part of a test case initiation process, the computer 18 may send a "power on" signal to infotainment unit 12 (or other VSM) thereby causing the VSM to power on (step 220). Thereafter, the computer 18 may send a command to the VSM to operate in a particular mode, such as a particular test mode or debug mode. In addition, the computer 18 can send test case information that is necessary or useful to the VSM in carrying out a particular test procedure. The test case information can be a test case identifier that identifies a particular test that is to be carried out by the VSM test application. The method 200 then continues to step 230.

In step 230, one or more initial VSM test actions are carried out. As used herein, an initial VSM test action is any action that is taken as to initiate a test procedure or process that is to be performed on the VSM. At least in one embodiment, the initial VSM test actions can include: tuning a radio receiver installed in the VSM or coupled to the VSM to a particular radio station; playing a verbal command from an audio speaker included in or connected to the computer, wherein the verbal command is an audio signal portraying one or more spoken words that are intended to cause the VSM to perform an operation; calling a cellular device included in or connected to the VSM through use of a cellular carrier system; establishing a short-range wireless communications (SRWC) connection between the VSM and a SRWC device using a SRWC circuit coupled to VSM and a SRWC circuit installed in the SRWC device; sending a command message to the VSM, wherein the command message includes a command intended to cause the VSM to perform an operation; and/or recalling a test operation from a computer-readable test file that is stored on memory on the computer or on another computer that is communicatively coupled to the computer. In some embodiments, a series of initial VSM test actions may be carried out in order to test certain functionality of the infotainment unit 12 (or other VSM).

In one scenario, a VSM radio test procedure can be carried out by the VSM test application that enables the testing of VSM radio playback functionality. In such a scenario, the test application may transmit radio signals on one or more FM and/or AM radio stations, which are to be picked up and played by the infotainment unit using speaker 36. The audio played through speaker 36 may then be processed by the computer 18 to verify or record the results of the test procedure. Thus, in such a scenario, the initial VSM test action may include tuning the radio receiver of the infotainment unit 12 to one or more of the FM or AM stations that the radio transmitter 50 of the computer 18 is transmitting audio on. In this scenario, and in other scenarios involving audio playback by the infotainment unit 12 (or other VSM), audio with special patterns (e.g., special tune patterns) can be generated and then tested for playback by the infotainment unit 12 (or other VSM). This audio with special patterns can be used to cover special test cases, such as for use in testing of fast-forwarding and rewinding features of the infotainment unit 12.

In another scenario, a VSM verbal command test procedure may be carried out by the VSM test application that enables testing of the VSM's voice automated control features. In such a scenario, the computer 18 can play a verbal command from audio speaker 56. The verbal command is an audio signal portraying one or more spoken words that are intended to cause the VSM to perform an operation, such as turning the volume up or tuning the infotainment unit to a different radio station. In such a case, the computer can test the VSM speech recognition capabilities, as well as the subsequent operations in which it is intended to carry out. Also, in this scenario, the VSM may be configured to receive the verbal command using the VSM microphone 34; access an audio grammar of the VSM, wherein the audio grammar of the VSM is stored in a non-transitory, computer-readable memory of the VSM or accessible by the VSM; and process the one or more audio signals using the audio grammar of the VSM to obtain one or more words being conveyed by the audio signal; and perform an operation corresponding to the one or more words being conveyed by the audio signal. After playing the verbal command, the computer 18 may then receive audio (or information via another means) from infotainment unit 12, which can be used to verify or corroborate that the infotainment unit 12 performed the correct operation in response to the verbal command. In other embodiments, the computer 18 can receive other information to verify that the VSM carried out the correct operation(s) in response to the verbal command, such as receiving a log file and/or images or graphics that were displayed on display 38 of the infotainment unit. And, in some embodiments, a series of verbal commands can be played via audio speaker 56 and the operations of the VSM thereafter can be analyzed to verify that the correct sequence of operations were performed by the VSM.

In yet another scenario, a VSM cellular capabilities test procedure can be carried out by the VSM test application that enables testing of the VSM's cellular capabilities. For example, the infotainment unit's cellular telephonic functionality can be tested by having the computer 18 place a call to the infotainment unit 12. In one particular scenario, the computer 18 can instruct cellular device 14 to place a call to the infotainment unit 12. The infotainment unit 12 can then receive the call and, according to the test procedures, certain audio can be played over the cellular call from the computer (or cellular device 14) to the infotainment unit 12. The audio is then played back on speaker 36, which can be received at microphone 54 of computer 18. The received audio can then be tested using known audio recognition techniques, such as those described below in step 260.

Other test scenarios exist, such as testing a short-range wireless communication (SRWC) connection and/or playback of media via the SRWC connection. For example, computer 18 may use SRWC circuit 44 to connect to infotainment unit 12 and to send media for playback at infotainment unit 12 using, for example, speaker 36. Then, computer 18 may use microphone 54 to receive audio from speaker 36 and, using processing techniques described below in step 260, can determine whether the infotainment unit 12 (or other VSM) performed the operation correctly and/or can record the results of the VSM. In another scenario, a command message may be sent to the VSM and, using a variety of techniques, such as some of those discussed above with respect to the other scenarios, the computer 18 can verify the desired operation was correctly performed by the VSM. For example, a command signal can be sent to the VSM that directs the VSM to carry out a particular multimedia function, wherein the particular multimedia function includes one of the following: playing audio from a particular multimedia source, continuing playing audio, pausing playback of audio, fast-forwarding playback of audio, and/or rewinding playback of audio. The particular multimedia source can be a mobile device that streams audio using SRWC (e.g., Bluetooth™ Low Energy (BLE)), a remote streaming service that is accessed via the Internet, or audio from computer 18. In yet another scenario, a test operation may be recalled from a computer-readable test file that is stored on memory of the computer or another computer that is communicatively coupled to the computer, such as computer 80 (see land network 16 and modem 60). The method 200 continues to step 240.

In step 240, one or more VSM test operations are logged. As used herein, a VSM test operation is an operation that is performed by the VSM during a test procedure. For example, infotainment unit 12 can keep a test log file stored in memory and, during testing of the infotainment unit 12, the VSM can execute a logger application or daemon process (e.g., which may be a part of a test or debug mode in which the VSM is initiated to in step 220) that records the operations of the VSM during one or more test procedures. Various information can be stored, such as an identifier of an operation or process, memory locations of information pertaining to the test operations, and/or metadata information pertaining to the operation, such as a present time the operation was carried out (e.g., a timestamp). The logging of the one or more VSM test operations can be carried out at any and/or all times between the initiation of the VSM (step 220) and the end of the method (step 280). The method 200 continues to step 250.

In step 250, the computer 18 listens for one or more audio signals from the VSM audio speaker using the computer microphone. As used herein, a "computer microphone" is a microphone that is communicatively coupled to the test computer, including microphones that are installed as a part of the computer 18, microphones that are connected via a wired cable or connection (e.g., a universal serial bus (USB) cable), and microphones that are connected to computer 18 via wireless networking means (e.g., SRWC). In some embodiments, once the computer 18 performs the initial VSM test action(s), the computer can actively listen for one or more audio signals. Upon receiving one or more audio signals, the computer 18 can record the signals and/or other information pertaining to the signals (e.g., logging information (such as that discussed above with respect to infotainment unit 12 (or other VSM) at step 240)).

However, in other embodiments, the test procedure that is being carried out by test computer 18 may not require or desire to listen for audio playback from the test VSM, but rather can use other techniques to obtain information that can be used to verify that the VSM has performed the correct operation in response to the initial VSM test action(s). For example, the computer 18 can, in response to carrying out the one or more initial test actions, obtain one or more log files of the VSM, such as those created in step 240. In other embodiments, the computer 18 can be connected to a camera (e.g., via USB or SRWC) and can use image recognition techniques to determine whether the display of infotainment unit 12 corresponds with the one or more initial VSM test actions (steps 260-280). The method 200 then proceeds to step 260.

In step 260, one or more of the audio signals are processed using computer-based audio recognition techniques. In one embodiment, the computer 18 can process the received audio to obtain an "audio fingerprint" that can be used to compare to a set of audio files to determine whether the playback by the VSM via speaker 36 is correct (step 280). As used herein, the "audio fingerprint" is a set of data representing one or more audio signals that is obtained through use of a time-frequency analysis of the audio signals. At least in some embodiments, the "audio fingerprint" can be obtained by generating a spectrogram of frequency, amplitude, and/or time of the various audio signals and, thereafter, recording points to interest of the spectrogram. In some embodiments, the points of interest may correspond to a triplet of amplitude, frequency, and time. The points of interest can be triplets that correspond to high amplitudes (e.g., those more likely to be picked up by microphone 54) and/or that are determined to be unique. In one embodiment, the audio fingerprint is obtained through use of a music recognition algorithm, which can also be used to obtain a title of the one or more audio signals based on the audio fingerprint. Then, once the audio fingerprint of the received audio signals is obtained, the computer 18 can compare the audio fingerprint with one or more previously generated audio fingerprints that are stored in memory 42 of computer 18 or that are stored at a database on a remote server, such as at a database connected to computer 80.

In another embodiment, the computer 18 can use speech recognition techniques to recognize one or more words from audio speaker 36. In such an embodiment, the computer can access an audio grammar of the VSM and, using the audio grammar, processing the one or more audio signals to determine one or more words being conveyed by the VSM through the one or more audio signals. And, furthermore, the one or more words can be used to determine whether the one or more performed VSM operations correspond to the one or more VSM test action.

In other embodiments, the computer 18 may carry out other processing not involving audio recognition, such as in the cases where the VSM is not expected to playback audio and/or where the computer cannot verify the test operations of infotainment unit 12 (or other VSM) are correct using audio (e.g., because another feature is being tested, such as displaying certain information on display 38). For example, computer 18 can be connected to a digital camera that has its lens directed towards display 38 of infotainment unit 12 such that the display 38 is in the field of view of the camera. The camera can then capture images and/or video of the display 38. These images and/or video may be processed using image recognition techniques. Other data received at step 250 can also be processed during this step as to prepare the data for the identifying step 270 and/or the determining step 280 of method 200, as discussed below. The method then continues to step 270.

In step 270, one or more performed VSM operations are identified based on the processing step. In one embodiment, the obtained or generated audio fingerprint of the received audio signals can be compared to an audio fingerprint of an audio file. For example, in many cases, the VSM test application is aware of the particular audio (e.g., a particular song) that is expected to be played back by the infotainment unit via speaker 36. Thus, the VSM test application can generate or obtain a fingerprint of the entire audio file or song and, thereafter, compare the audio fingerprint of the received audio signals with the fingerprint of the entire audio file. In other embodiments, the VSM test application may use the generated audio fingerprint of the received audio signals as an input into a query of one or more databases that contain numerous audio fingerprints of various audio. Once the computer 18 determines the character of the received audio using audio processing techniques, some of which are discussed above, the computer 18 can determine a VSM operation that corresponds to the received audio.

In another embodiment, the computer 18 may expect to receive no audio playback from speaker 36 of infotainment unit 12 and, thus, the computer 18 can use the existence of silence (e.g., the fact that no audio (or no significant audio— e.g., audio above a particular amplitude threshold—has been received)) to determine the VSM operation, which may be to "pause" an audio output function (e.g., pause a song being played by infotainment unit 12 through use of a SRWC connection with computer 18).

Yet, in another embodiment, audio processing may not be needed or used to identify the one or more performed VSM operations. For example, in the case where the computer receives or obtains a log file of the VSM, the computer 18 can use the information of the log file to determine the operations that the VSM performed. In one scenario, the VSM may store a process identifier (PID) or other identifier that can be used in conjunction with a look up table to determine a particular VSM function. The method 200 continues to step 280.

In step 280, it is determined whether the one or more performed VSM operations correspond to the one or more VSM test actions. This step can include using the processor 40 to compare the performed VSM operations to VSM test actions that are stored at computer 18, such as in a test file that includes the VSM test actions that the VSM was expected to carry out. The results of the comparison may be stored to memory 42 or another memory, such as a database on computer 80. Also, upon the determination that the VSM has failed a test case (e.g., the performed VSM operations do not correspond to the VSM test action(s)), then the computer 18 may notify a test engineer via a message to mobile device 14 or via use of display 58 and/or speaker 56. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of testing one or more operations of a vehicle system module (VSM) using computer-based audio recognition techniques, wherein the method is carried out by a computer that includes or is connected to a microphone, wherein the VSM includes or is connected to an audio speaker, and wherein the method comprises the steps of:
   receiving a verbal command via a VSM microphone included in or connected to the VSM;
   in response to the received verbal command, carrying out one or more initial VSM test actions, wherein the one or more initial VSM test actions include one or more of the following:
      tuning a radio receiver installed in the VSM or coupled to the VSM to a particular radio station;
      playing the verbal command from an audio speaker included in or connected to the computer, wherein the verbal command is an audio signal portraying one or more spoken words that are intended to cause the VSM to perform an operation;
      calling a cellular device included in or connected to the VSM through use of a cellular carrier system;
      establishing a short-range wireless communications (SRWC) connection between the VSM and a SRWC device using a SRWC circuit coupled to VSM and a SRWC circuit installed in the SRWC device;
      sending a command message to the VSM, wherein the command message includes a command intended to cause the VSM to perform an operation; and
   recalling a test operation from a computer-readable test file that is stored on memory on the computer or on another computer that is communicatively coupled to the computer;
   listening for one or more audio signals from the VSM audio speaker using the computer microphone;
   processing the one or more audio signals using computer-based audio-recognition technique(s); and
   determining whether the one or more performed VSM operations correspond to one or more VSM test actions.

2. The method of claim 1, wherein the one or more initial VSM test actions includes tuning the radio receiver installed in the VSM or coupled to the VSM to the particular radio station.

3. The method of claim 2, further comprising the step of transmitting one or more radio signals using a radio transmitter that is included in or connected to the computer, wherein the one or more radio signals are amplitude modulated (AM) or frequency modulated (FM) signals that are used to convey audio, wherein the VSM is configured to receive the one or more radio signals using the radio receiver.

4. The method of claim 1, wherein the one or more initial VSM test actions includes sending audio signals to be played by the VSM to the VSM and/or commanding the VSM to play audio from a particular multimedia source, wherein the particular multimedia source includes any one or more of the following: an amplitude modulated (AM) or frequency modulated (FM) radio station, an audio stream from a short-range wireless communication (SRWC) enabled mobile device, or audio from a cellular telephone call.

5. The method of claim 4, further comprising the steps of generating an audio fingerprint based on the one or more audio signals from the VSM audio speaker and determining whether the one or more performed VSM operations correspond to the one or more VSM test actions using the audio fingerprint.

6. The method of claim 5, further comprising the steps of comparing the generated audio fingerprint to another audio fingerprint and, based on the comparison, then determining whether the one or more performed VSM operations correspond to the one or more VSM test actions.

7. The method of claim 6, wherein the audio fingerprint is obtained through use of a music recognition algorithm, and further comprising the step of obtaining a title of the one or more audio signals based on the audio fingerprint.

8. The method of claim 4, further comprising the step of sending a command signal to the VSM that directs the VSM to carry out a particular multimedia function, wherein the particular multimedia function includes one of the following: playing audio from a particular multimedia source, continuing playing audio, pausing playback of audio, fast-forwarding playback of audio, and/or rewinding playback of audio.

9. The method of claim 8, further comprising the step of sending another command signal to the VSM that directs the VSM to carry out another particular multimedia function, wherein the another particular multimedia function includes one of the following: playing audio from a particular multimedia source, continuing playing audio, pausing playback of audio, fast-forwarding playback of audio, and/or rewinding playback of audio.

10. The method of claim 1, wherein the one or more initial VSM test actions includes playing the verbal command from the audio speaker included in or connected to the computer.

11. The method of claim 10, wherein the processing step further includes accessing an audio grammar of the VSM and, using the audio grammar, processing the one or more audio signals to determine one or more words being conveyed by the VSM through the one or more audio signals.

12. The method of claim 11, wherein the one or more words are used to determine whether the one or more performed VSM operations correspond to the one or more VSM test actions.

13. The method of claim 1, further comprising the step of identifying, based on the processing step, the one or more performed VSM operations.

14. A method of testing one or more operations of a vehicle system module (VSM) using computer-based audio recognition techniques, wherein the method is carried out by a computer that includes or is connected to a speaker, wherein the VSM includes or is connected to a microphone, and wherein the method comprises the steps of:
- playing a verbal command from the audio speaker of the computer, wherein the verbal command is an audio signal portraying one or more spoken words that are intended to cause the VSM to perform an intended operation, and wherein the VSM is configured to:
  - receive the verbal command using the VSM microphone;
  - access an audio grammar of the VSM, wherein the audio grammar of the VSM is stored in a non-transitory, computer-readable memory of the VSM or accessible by the VSM;
  - process the one or more audio signals using the audio grammar of the VSM to obtain one or more words being conveyed by the audio signal; and
  - perform an operation corresponding to the one or more words being conveyed by the audio signal;
- after playing the verbal command from the audio of the computer, receiving a VSM operation response;
- identifying one or more performed VSM operations based on the VSM operation response; and
- determining whether the one or more performed VSM operations correspond to the intended operation based on comparing the one or more audio signals.

15. A method of testing one or more operations of a vehicle system module (VSM) using computer-based audio recognition techniques, wherein the method is carried out by a computer that includes or is connected to a microphone, wherein the VSM includes or is connected to an audio speaker, and wherein the method comprises the steps of:
- carrying out one or more initial VSM test actions, wherein the one or more initial VSM test actions include one or more of the following:
  - tuning a radio receiver installed in the VSM or coupled to the VSM to a particular radio station;
  - calling a cellular device included in or connected to the VSM through use of a cellular carrier system; and
  - establishing a short-range wireless communications (SRWC) connection between the VSM and a SRWC device using a SRWC circuit;
- after carrying out the one or more initial VSM test actions, listening for one or more audio signals from the VSM audio speaker using the computer microphone;
- generating an audio fingerprint based on the one or more audio signals from the VSM audio speaker using computer-based audio-recognition technique(s), wherein the audio fingerprint is a set of data representing the one or more audio signals that is obtained through use of a time-frequency analysis of the one or more audio signals; and
- determining whether one or more performed VSM operations correspond to one or more VSM test actions based on comparing the audio fingerprint to one or more expected audio fingerprints, wherein the one or more expected audio fingerprints are audio fingerprints that were generated based on one or more test audio files.

16. The method of claim 15, wherein the one or more initial VSM test actions are initiated in response to a verbal command sent from a speaker included or connected to the computer.

* * * * *